United States Patent
Sugiura et al.

(10) Patent No.: US 7,929,090 B2
(45) Date of Patent: Apr. 19, 2011

(54) LIQUID CRYSTAL DISPLAY AND METHOD OF MANUFACTURING THE SAME

(75) Inventors: Norio Sugiura, Miyagi (JP); Satoshi Murata, Tottori (JP); Kengo Kanii, Kumamoto (JP); Shota Makimoto, Tottori (JP); Katsufumi Ohmuro, Kanagawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 144 days.

(21) Appl. No.: 11/367,774

(22) Filed: Mar. 6, 2006
(Under 37 CFR 1.47)

(65) Prior Publication Data

US 2007/0035691 A1     Feb. 15, 2007

(30) Foreign Application Priority Data

Mar. 7, 2005 (JP) ................................ 2005-062527

(51) Int. Cl.
   G02F 1/13     (2006.01)
   G02F 1/1337   (2006.01)
(52) U.S. Cl. ........................................ 349/123; 349/187
(58) Field of Classification Search .............. 349/86–94, 349/123–136, 147, 187
   See application file for complete search history.

(56) References Cited

U.S. PATENT DOCUMENTS

| | | | |
|---|---|---|---|
| 5,327,271 A * | 7/1994 | Takeuchi et al. | 349/88 |
| 5,351,143 A | 9/1994 | Sato et al. | |
| 5,501,884 A * | 3/1996 | Nakayama et al. | 428/1.26 |
| 5,594,562 A | 1/1997 | Sato et al. | |
| 6,084,058 A * | 7/2000 | Murata et al. | 528/353 |
| 2002/0196393 A1 | 12/2002 | Tashiro et al. | |
| 2003/0025864 A1 | 2/2003 | Chida et al. | |
| 2003/0043336 A1 | 3/2003 | Sasaki et al. | |
| 2003/0112384 A1 | 6/2003 | Tanaka et al. | |
| 2003/0151703 A1 | 8/2003 | Nakanishi et al. | |
| 2004/0141125 A1 * | 7/2004 | Tashiro et al. | 349/130 |
| 2005/0030460 A1 * | 2/2005 | Kim et al. | 349/139 |

FOREIGN PATENT DOCUMENTS

| | | |
|---|---|---|
| JP | 5-281530 | 10/1993 |
| JP | 9-080396 | 3/1997 |
| JP | 09-269509 | 10/1997 |
| JP | 10-170922 | 6/1998 |

(Continued)

OTHER PUBLICATIONS

JP A 2001-222017 dated Aug. 17, 2001 corresponds to US 2002/0196393 listed above.

(Continued)

*Primary Examiner* — David Nelms
*Assistant Examiner* — Jessica M Merlin
(74) *Attorney, Agent, or Firm* — Nixon & Vanderhye P.C.

(57) ABSTRACT

The invention relates to a liquid crystal display used as a display unit of an electronic apparatus and a method of manufacturing the same and provides a liquid crystal display which can achieve high display quality and a method of manufacturing the same. A liquid crystal including a polymeric component and having a specific resistance of $1 \times 10^{13}$ Ω·cm or more at room temperature (25° C.) is dispensed onto a TFT substrate. After combining the TFT substrate with an opposite substrate in vacuum, the atmospheric pressure is restored to fill a gap between the TFT substrate and the opposite substrate with the liquid crystal, thereby forming a liquid crystal layer. The polymeric component is polymerized while applying a predetermined voltage to the liquid crystal layer to form polymer layers.

5 Claims, 8 Drawing Sheets

FOREIGN PATENT DOCUMENTS

| | | |
|---|---|---|
| JP | 10-206858 | 8/1998 |
| JP | 11-100579 | 4/1999 |
| JP | 2003-43492 | 2/2003 |
| JP | 2003-149647 | 5/2003 |
| KR | 2003-0048350 | 6/2003 |

OTHER PUBLICATIONS

JP A 2003-228050 dated Aug. 15, 2003 corresponds to US 2003/0151703 listed above.

* cited by examiner

LIQUID CRYSTAL DISPLAY AND METHOD OF MANUFACTURING THE SAME

BACKGROUND OF THE INVENTION

1. Field of the Invention

The present invention relates to a liquid crystal display used as a display unit of an electronic apparatus and a method of manufacturing the same.

2. Description of the Related Art

Recently, liquid crystal displays are used as monitors of television receivers and personal computers. In such applications, a display is required to have a wide viewing angle so that the display screen can be viewed in all directions. MVA (Multi-domain Vertical Alignment) liquid crystal displays are known as liquid crystal displays which can provide a wide viewing angle. An MVA liquid crystal display includes a liquid crystal having negative dielectric constant anisotropy sealed between a pair of substrates, vertical alignment films for aligning liquid crystal molecules substantially perpendicularly to surfaces of the substrates, and alignment regulating structures for regulating the direction of alignment of the liquid crystal molecules. Linear protrusions and blanks (main slits) in electrodes are used as the alignment regulating structures. When a voltage is applied, liquid crystal molecules are tilted in directions perpendicular to directions in which the alignment regulating structures extend. The alignment regulating structures are used to provide a plurality of regions which are different from each other in the aligning direction of liquid crystal molecules in each pixel, whereby a wide viewing angle is achieved.

In the case of an MVA liquid crystal display, however, since linear protrusions or main slits having a relatively great width are provided in pixel regions, the aperture ratio of the pixels becomes smaller than that in a TN mode liquid crystal display having no alignment regulating structure, which results in a problem in that high light transmittance cannot be achieved.

In order to solve the above-described problem, some MVA liquid crystal displays are provided with pixel electrodes having a cross-shaped electrode extending in parallel with or perpendicularly to bus lines, a plurality of stripe-shaped electrodes obliquely branching from the cross-shaped electrodes and extending in four orthogonal directions, and fine slits formed between stripe-shaped electrodes adjacent to each other. When a voltage is applied, liquid crystal molecules are tilted by oblique electric fields generated at edges of the pixel electrodes in directions in parallel with directions in which the fine slits extend. In the case of such an MVA liquid crystal display, any reduction in the aperture ratio can be suppressed because there is no linear protrusion or main slit having a great width in pixel regions. However, since an alignment regulating force provided by stripe-shaped electrodes and fine slits is weaker than an alignment regulating force provided by linear protrusions or main slits, a problem arises in that the liquid crystal will have a long response time and in that alignment is liable to disturbance attributable to a press with a finger.

Under the circumstance, liquid crystal displays having the above-described pixel configuration employ a polymer sustained alignment (PSA) technique for memorizing tilting directions of liquid crystal molecules by mixing a polymeric component that can be optically or thermally polymerized (a monomer or oligomer) in the liquid crystal in advance and polymerizing the polymeric component while the liquid crystal molecules are tilted by a voltage applied thereto (see Patent Document 1 for example). In a liquid crystal display employing the PSA technique, since polymer layers which memorize tilting directions of liquid crystal molecules are formed at interfaces between the liquid crystal and alignment films, a high alignment regulating force can be obtained. Thus, the liquid crystal has a short response time, and liquid crystal molecules can be reliably tilted in directions in parallel with directions in which fine slits extend. It is therefore possible to provide an MVA liquid crystal display which is less liable to disturbance of liquid crystal alignment even when pressed by a finger.

The one drop filling (ODF) method is known as a method of filling a gap between substrate with a liquid crystal. According to the ODF method, a seal material is continuously applied in the form of a frame along the periphery of one substrate; a prescribed amount of liquid crystal is dispensed inside the frame on the substrate; the substrate is combined with another substrate in vacuum; and the atmospheric pressure is restored to fill a gap between the substrates with the liquid crystal. The use of the ODF method makes it possible to complete substrate combining and liquid crystal filling substantially at the same time, which significantly simplifies steps for manufacturing a liquid crystal display.

Patent Document 1: JP-A-2003-149647
Patent Document 2: JP-A-5-281530
Patent Document 3: JP-A-9-80396

FIG. 9 is an enlarged view of the neighborhood of a part of a display screen of a liquid crystal display fabricated using the ODF method where a liquid crystal has been dispensed. As shown in FIG. 9, in the liquid crystal display fabricated using the ODF method, a display irregularity or so-called dispensing mark may be visually perceived in the part where the liquid crystal has been dispensed enclosed by a broken line. For this reason, a liquid crystal display fabricated using the ODF method has a problem in that it is difficult to achieve high display quality. In particular, the problem is significant in a liquid crystal display employing the PSA technique because a dispensing mark is more visually perceivable on the same.

SUMMARY OF THE INVENTION

It is an object of the invention to provide a liquid crystal display which can achieve high display quality and a method of manufacturing the same.

The above-described object is achieved by a method of manufacturing a liquid crystal display characterized in that it includes the steps of dispensing a liquid crystal including a polymeric component and having a specific resistance of $1 \times 10^{13}$ Ω·cm or more at room temperature (25° C.) onto a first substrate, combining the first substrate with a second substrate in vacuum and thereafter restoring the atmospheric pressure to fill a gap between the first and second substrates with the liquid crystal, and polymerizing the polymeric component while applying a predetermined voltage to the liquid crystal.

The invention makes it possible to provide a liquid crystal display which can achieve high display quality.

DESCRIPTION OF THE PREFERRED EMBODIMENTS

Figure 1:
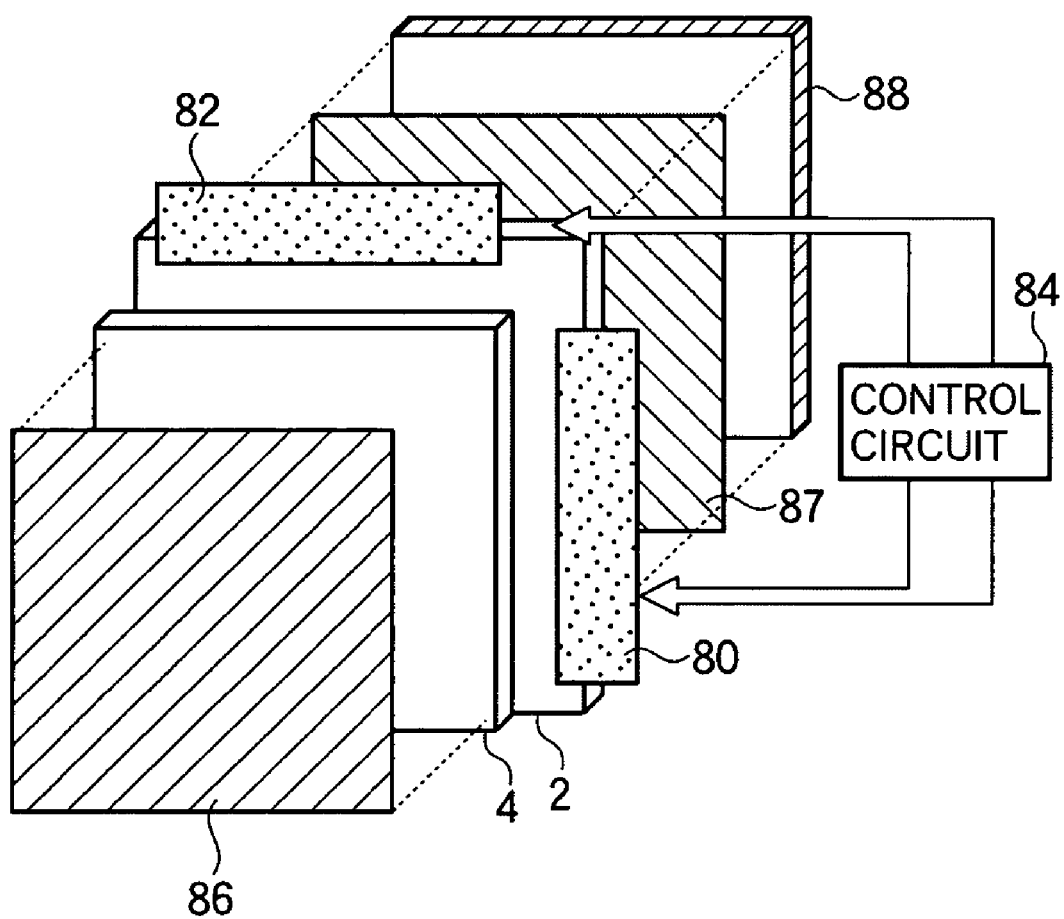
FIG. 1 shows a schematic configuration of a liquid crystal display according to an embodiment of the invention.

A liquid crystal display according to an embodiment of the invention will now be described with reference to FIGS. 1 to 7. FIG. 1 shows a schematic configuration of the liquid crystal display according to the present embodiment of the invention. As shown in FIG. 1, the liquid crystal display includes a TFT substrate 2 having gate bus lines and drain bus lines formed across each other with an insulation film interposed between them and a thin film transistor (TFT) and a pixel electrode formed at each pixel. The liquid crystal display also includes an opposite substrate 4 formed with color filters (CF) and a common electrode and provided opposite to the TFT substrate 2. The substrates 2 and 4 are combined through a sealing material which is continuously formed along the entire peripheries of the surfaces thereof facing each other. A vertically aligned liquid crystal having negative dielectric constant anisotropy is sealed between the substrates 2 and 4 to form a liquid crystal layer 6 (which is not shown in FIG. 1). The liquid crystal used in the present embodiment of the invention has a specific resistance of about $1 \times 10^{13}$ Ω·cm or more at room temperature (25° C.).

The TFT substrate 2 is connected to a gate bus line driving circuit 80 loaded with a driver IC for driving a plurality of gate bus lines and a drain bus line driving circuit 82 loaded with a driver IC for driving a plurality of drain bus lines. The driving circuits 80 and 82 output scan signals and data signals to predetermined gate bus lines and drain bus lines based on predetermined signals output by a control circuit 84. A polarizer 87 is provided on a surface of the TFT substrate 2 opposite to the surface thereof on which the TFT elements are formed, and a polarizer 86 is provided on a surface of the opposite substrate 4 opposite to the surface thereof on which the common electrode is formed, the polarizer 86 being in a crossed Nicols relationship with the polarizer 87. A backlight unit 88 is provided on a surface of the polarizer 87 opposite to the surface thereof facing the TFT substrate 2.

Figure 2:
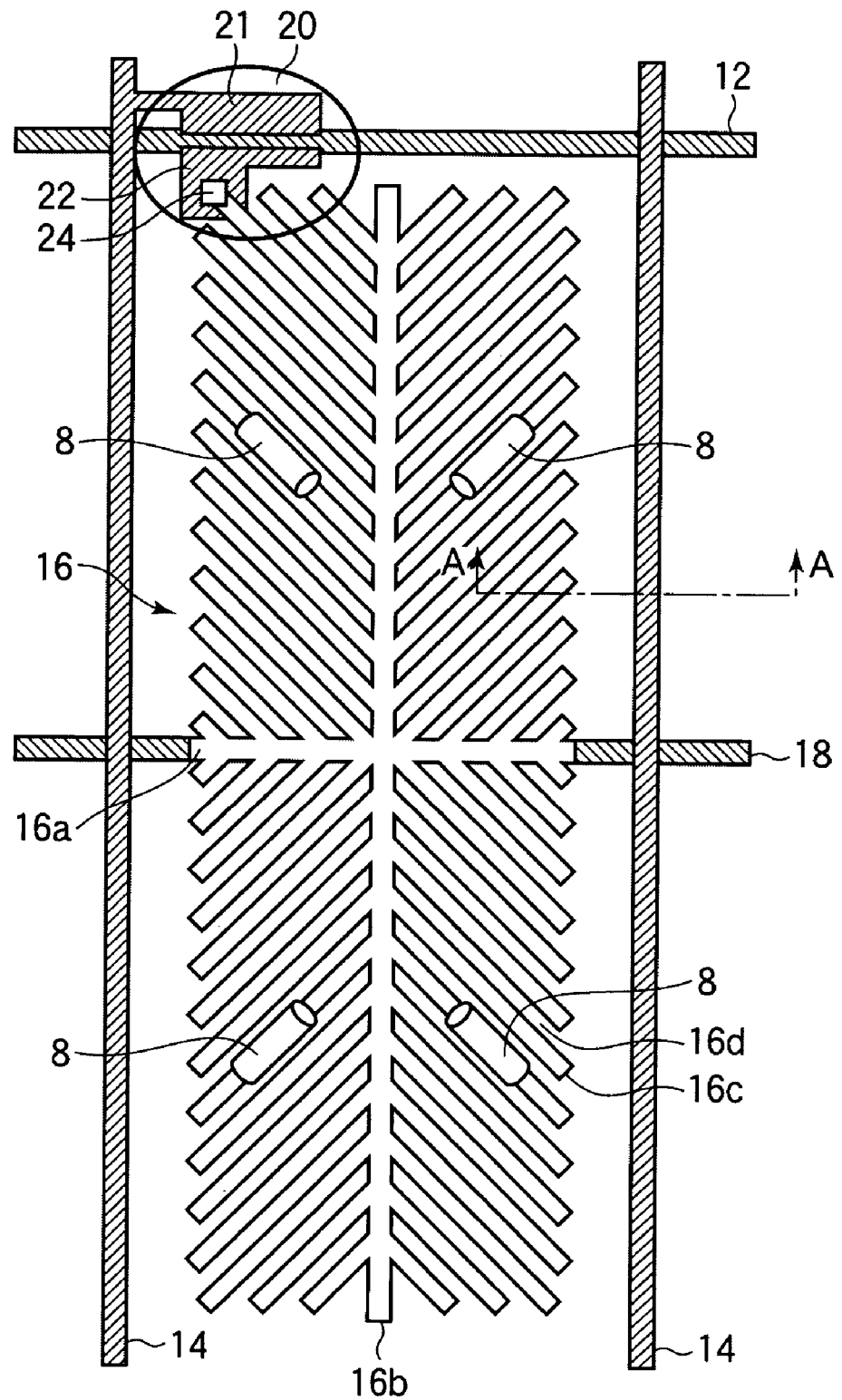
FIG. 2 shows a configuration of one pixel of the liquid crystal display according to the embodiment of the invention.
Figure 3:
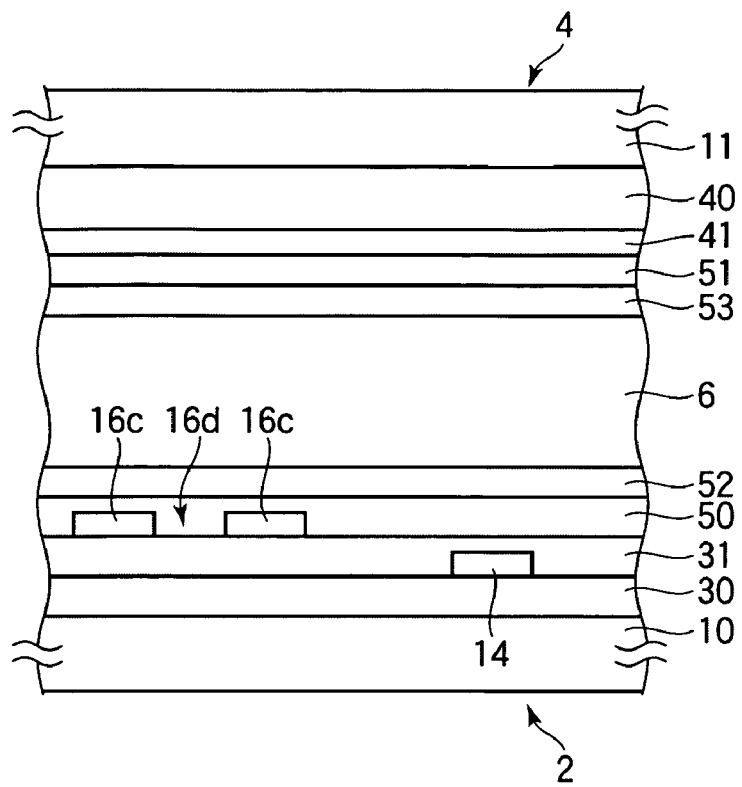
FIG. 3 is a sectional view showing the configuration of one pixel of the liquid crystal display according to the embodiment of the invention.

FIG. 2 shows a configuration of one pixel of the liquid crystal display according to the present embodiment of the invention. FIG. 3 shows a sectional configuration of the liquid crystal display taken along A-A line in FIG. 2. FIG. 2 also schematically shows directions of alignment of liquid crystal molecules 8. As shown in FIGS. 2 and 3, the TFT substrate 2 of the liquid crystal display includes a plurality of gate bus lines 12 formed on a transparent insulation substrate (e.g., a glass substrate) 10 and a plurality of drain bus lines 14 formed to extend across the gate bus lines 12 with an insulation film 30 interposed between them. Storage capacitor bus lines 18 extending in parallel with the gate bus lines 12 are formed across pixel regions surrounded by the gate bus lines 12 and the drain bus lines 14. TFTs 20 are formed in the vicinity of intersections between the gate bus lines 12 and the drain bus lines 14, a TFT 20 being provided as a switching element at each pixel. A drain electrode 21 of a TFT 20 is electrically connected to a drain bus line 14, and a part of a gate bus line 12 serves as a gate electrode of a TFT 20. A protective film 31 is formed above the drain bus lines 14 and the TFTs 20 throughout the substrate.

A pixel electrode 16 constituted by a transparent conductive film such as an ITO is formed at each pixel region on the protective film 31. The pixel electrode 16 is electrically connected to a source electrode 22 of the TFT 20 associated therewith through a contact hole 24 which is an opening in the protective film 31. The pixel electrode 16 includes a liner electrode 16a extending substantially in parallel with the gate bus lines 12 and a linear electrode 16b intersecting with the linear electrode 16a in the form of a cross and extending substantially in parallel with the drain bus lines 14. The pixel electrode 16 also includes a plurality of linear electrodes 16c obliquely branching from the linear electrode 16a or 16b and extending in the form of stripes in four orthogonal directions in the single pixel and fine slits 16d formed between linear electrodes 16c which are adjacent to each other. An alignment film 50 is formed above the pixel electrodes 16 throughout the substrate to align liquid crystal molecules 8 substantially perpendicularly to the surface of the substrate. For example, a polymer layer 52 for regulating the direction of alignment of the liquid crystal molecules 8 is formed at the interface between the alignment film 50 and the liquid crystal layer 6.

The opposite substrate 4 includes CF resin layers 40 formed on a glass substrate 11. A CF resin layer 40 in any of red, green, and blue is formed at each pixel. A common electrode 41 constituted by a transparent conductive film is formed on the CF resin layers 40 throughout the substrate. An alignment film 51 for aligning the liquid crystal molecules 8 substantially perpendicularly to the substrate surface is formed on the common electrode 41 throughout the substrate. A polymer layer 53 similar to the polymer layer 52 on the TFT substrate 2 is formed at the interface between the alignment film 51 and the liquid crystal layer 6. For example, the polymer layers 52 and 53 are formed by optically or thermally polymerizing a polymeric component such as a monomer included in the liquid crystal with a predetermined voltage applied to the liquid crystal layer 6. The polymer layers 52 and 53 keep the liquid crystal molecules 8 tilted at a predetermined pre-tilt angle to the substrate surfaces even after the applied voltage is removed. Thus, the tilting direction of the liquid crystal molecules 8 is regulated when the liquid crystal display panel is actually driven. As a result, since the liquid crystal molecules 8 are substantially uniformly tilted in the four orthogonal directions in one pixel when a voltage is applied, a liquid crystal display having a wide viewing angle can be provided.

Figure 4:
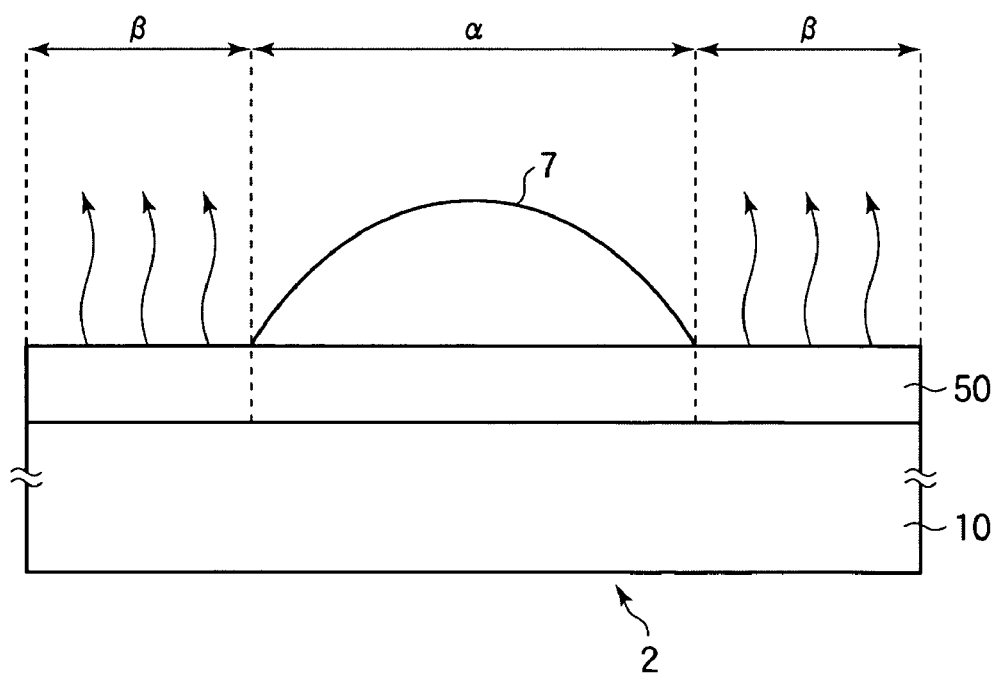
FIG. 4 is a sectional view schematically showing a state of a substrate after a liquid crystal is dispensed onto the same.

A description will now be made on a reason for the fact that a dispensing mark is visually perceived on a display screen of a liquid crystal display according to the related art fabricated using the ODF method. According to the ODF method, a seal material is continuously applied in the form of a frame along the periphery of one of the substrates; a prescribed amount of liquid crystal is dispensed inside the frame on the substrate, for example, in atmospheric pressure; the substrate is then combined with the other substrate in vacuum; and the atmospheric pressure is restored to fill a gap between the substrates with the liquid crystal. FIG. 4 is a sectional view schematically showing a state of the TFT substrate 2 after a liquid crystal 7 is dispensed onto the same. As shown in FIG. 4, after the liquid crystal is dispensed, the TFT substrate 2 is divided into a region α having the liquid crystal dispensed thereon and a region β having no liquid crystal dispensed thereon. During depressurization, moisture included in the alignment film 50 in the region β having no liquid crystal evaporates (as indicated by arrows in the figure) until the alignment film 50 is covered by the liquid crystal 7 that is spread. On the contrary in the region α having the liquid crystal dispensed thereon, since the alignment film 50 is covered by the liquid crystal 7 dispensed, moisture included in the alignment film 50 is unlikely to evaporate. The same thing occurs on the opposite substrate 4 that is combined with the TFT substrate 2 in vacuum, although omitted in the illustration. That is, in a region of the substrate corresponding to the region β having no liquid crystal dispensed, moisture included in the alignment film 51 evaporates until the alignment film 51 is covered by the liquid crystal 7 that is spread. On the contrary, in a region corresponding to the region α having the liquid crystal dispensed thereon, since the alignment film 51 is covered by the liquid crystal 7 when the substrates 2 and 4 are combined, moisture included in the alignment film 51 is unlikely to evaporate. As a result, the alignment films 50 and 51 have electrical characteristics which are different between the region a having the liquid crystal dispensed thereon and the region β having no liquid crystal dispensed thereon.

Figure 5:
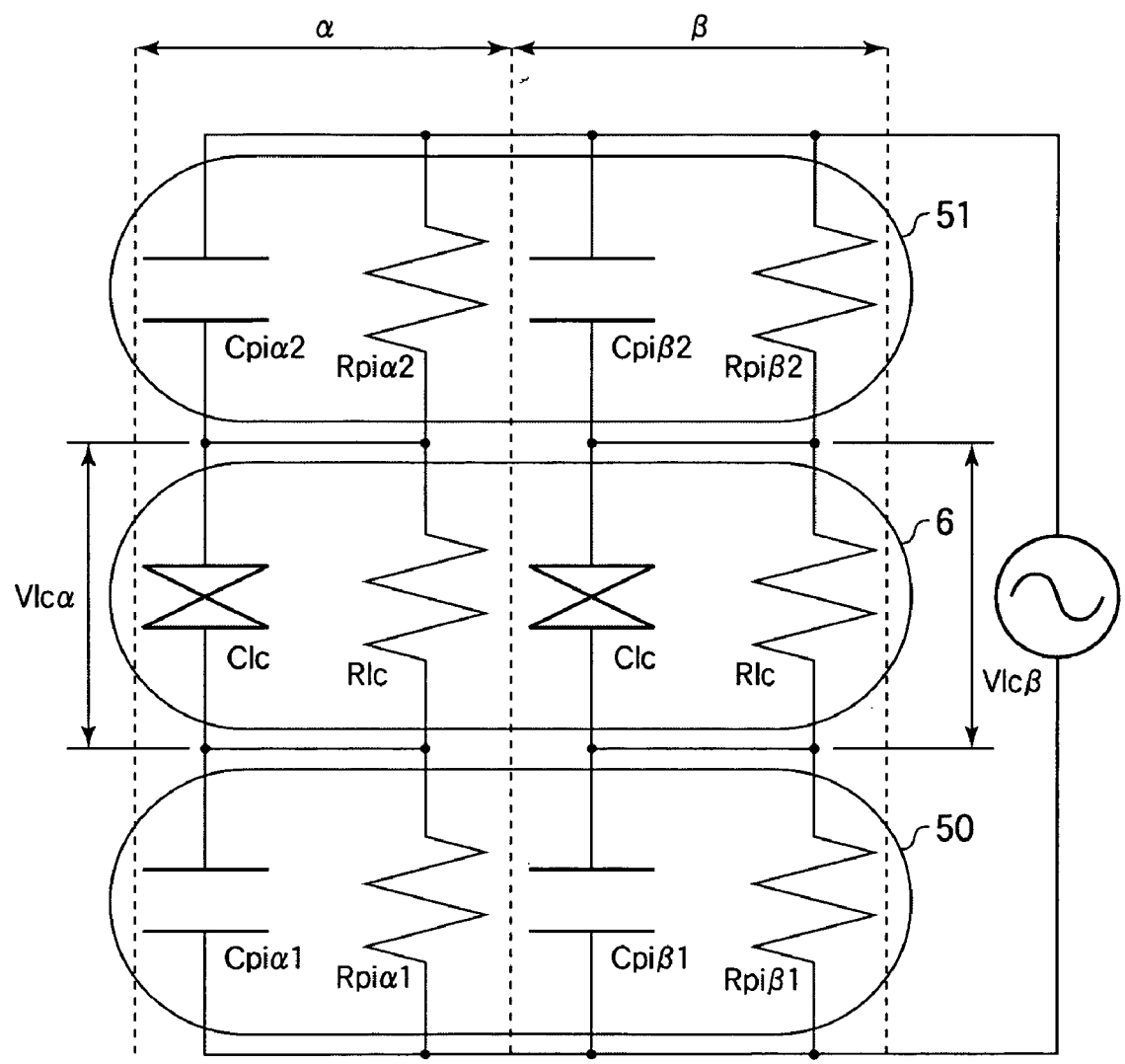
FIG. 5 schematically shows an equivalent circuit of one pixel of a liquid crystal display fabricated using the ODF method.

FIG. 5 schematically shows an equivalent circuit of one pixel of the liquid crystal display fabricated using the ODF method. As shown in FIG. 5, the region a having the liquid crystal dispensed thereon has a capacitive component $Cpi\alpha1$ of the alignment film 50, a capacitive component Clc of the liquid crystal layer 6, a capacitive component $Cpi\alpha2$ of the alignment film 51, a resistive component $Rpi\alpha1$ of the alignment film 50, a resistive component Rlc of the liquid crystal layer 6, and a resistive component $Rpi\alpha2$ of the alignment film 51. The region β having no liquid crystal dispensed thereon has a capacitive component $Cpi\beta1$ of the alignment film 50, a capacitive component Clc of the liquid crystal layer 6, a capacitive component $Cpi\beta2$ of the alignment film 51, a resistive component $Rpi\beta1$ of the alignment film 50, a resistive component Rlc of the liquid crystal layer 6, and a resistive component $Rpi\beta2$ of the alignment film 51. There are series-connections between like components, i.e., the capacitive components and the resistive components in the regions α and β, and there are parallel-connections between the capacitive components and the resistive components. As described above, the alignment films 50 and 51 have electrical characteristics which are different between the region α having the liquid crystal dispensed thereon and the region β having no liquid crystal dispensed thereon. Therefore, even if a uniform voltage is applied between the substrates 2 and 4, a voltage Vlcα applied to the liquid crystal layer 6 in the region α having the liquid crystal dispensed thereon will be different from a voltage Vlcβ applied to the liquid crystal layer 6 in the region β having no liquid crystal dispensed thereon. Since this results in a difference in light transmittance between the regions α and β, a display irregularity (dispensing mark) will be visually perceived on the display screen.

A description will now be made on a reason for the fact that a dispensing mark as described above is more visually perceivable on a liquid crystal display employing the PSA technique. According to the PSA technique, for example, a polymeric component which is polymerized by UV light is mixed in the liquid crystal in advance, and the polymeric component is polymerized while liquid crystal molecules are tilted by a voltage applied thereto, whereby a polymer layer for regulating aligning directions and a pre-tilt angle of the liquid crystal molecules is formed. The pre-tilt angle of the liquid crystal molecules varies depending on the voltage applied when the polymeric component is polymerized. However, the voltage applied to the liquid crystal layer 6 is different between the region α having the liquid crystal dispensed thereon and the region β having no liquid crystal dispensed thereon as described above. As a result, the pre-tilt angle of the liquid crystal molecules is different between the region α having the liquid crystal dispensed thereon and the region β having no liquid crystal dispensed thereon. Therefore, the difference in light transmittance between the regions α and β is greater and a dispensing mark is more visually perceivable on the liquid crystal display employing the PSA technique when compared to a liquid crystal display which does not employ the PSA technique.

In the liquid crystal display employing the PSA technique, the liquid crystal layer 6 is irradiated with UV light for polymerizing the polymerizable component. The specific resistance of the liquid crystal may lowers slightly due to irradiation with UV light, whereby a resistance component Rlc of the liquid crystal lowers. Due to lowering of the resistance component Rlc of the liquid crystal layer 6, the difference between the applied voltage to the liquid crystal layer 6 in the region α having the liquid crystal dispensed thereon and the applied voltage to the liquid crystal layer 6 in the region β having no liquid crystal dispensed thereon becomes large, so that a dispensing mark is more visually perceivable.

In the present embodiment of the invention, a liquid crystal having a relatively high specific resistance is used to increase the resistive component Rlc in the liquid crystal layer 6. A liquid crystal display employing the PSA technique can be provided with reduced visual perceptibility of a dispensing mark and hence high display quality even when fabricated according to the ODF method by using a liquid crystal having a specific resistance of $1\times10^{13}$ Ω·cm or more at room temperature (25° C.) or a liquid crystal which has a specific resistance of $1\times10^{13}$ Ω·cm or more at room temperature after the liquid crystal display is completed. The resistive component Rlc of the liquid crystal layer 6 increases to improve the voltage holding rate of the liquid crystal layer 6, the higher the specific resistance of the liquid crystal. Since sticking of display can therefore be suppressed by using a liquid crystal having a high specific resistance, display quality can be further improved.

A more specific description will now be made on the liquid crystal display and the method of manufacturing the same in the present embodiment of the invention with reference to preferred examples thereof.

EXAMPLE 1

Example 1 in the present embodiment of the invention will now be first described. Three kinds of n-type liquid crystals including a UV-polymerizable monomer and having different specific resistances were prepared. The three types of liquid crystals had specific resistances of $7.0\times10^{12}$ Ω·cm, $1\times10^{13}$ Ω·cm, and $3.3\times10^{13}$ Ω·cm, respectively, at room temperature (25° C.). Five types of vertical alignment film materials (polyimide or polyamic acid) PI1 to PI5 different from each other in water absorbability were prepared. The water absorbability of the alignment film materials was evaluated from the rates of changes in the voltage holding capacities (voltage holding capacity change rates) of alignment films formed using the materials which occurred when the films absorbed water. The voltage holding capacity change rates of the alignment film materials PI1 to PI5 were 5.0%, 2.1%, 1.2%, 0.8%, and 0.1%, respectively.

TFT substrates 2 having pixel electrodes 16 as shown in FIG. 2 were fabricated to provide 30 panels, and opposite substrates 4 having no alignment regulating structures such as protrusions and slits were fabricated to provide 30 panels. The five types of alignment film materials PI1 to PI5 were printed on the substrates 2 and 4 such that each material would serve six panels will have each material. In order to form alignment films having different electrical characteristics, the substrates 2 and 4 were heated at two different baking temperatures (200° C. and 220° C.) for ten minutes. Thus, the alignment film materials PI1 to PI5 were thus cured to form alignment films 50 and 51. Thus, three sets of substrates 2 and 4 of ten types each were fabricated by combining the five types of alignment film materials PI1 to PI5 and the two different baking temperatures (200° C. and 220° C.) in various ways.

The substrates 2 and 4 were then cleaned, and a seal material was continuously applied to the entire peripheries of the TFT substrates 2. Subsequently, the three types of liquid crystals were dispensed to 44 locations in the regions surrounded by the seal material of the ten types of TFT substrates 2. Next, the TFT substrates 2 and the opposite substrates 4 were combined in vacuum, and the atmospheric pressure was then restored to form liquid crystal layers 6 by filling gaps between the substrates 2 and 4 with the liquid crystals. A heating process was then performed to cure the seal material. Thereafter, chamfering was performed after cutting the substrates into each panel.

Next, a voltage of 17 V ac was applied to the liquid crystal layer 6 between each pixel electrode 16 and a common electrode 41. In this state, the liquid crystal layer 6 was irradiated with UV light having an irradiation energy density of 1000 mJ/cm². Thus, the monomer included in the liquid crystal was polymerized to form polymer layers 52 and 53 at interfaces between the liquid crystal layer 6 and the alignment film 50 and between the liquid crystal layer 6 and the alignment film 51, respectively. After the polymer layers 52 and 53 were formed, polarizers 86 and 87 were applied to the outsides of the substrates 2 and 4 in a crossed Nicols relationship. Thirty types of liquid crystal display panels, which were combinations of the three types of liquid crystals, the five types of alignment film materials, and the two alignment film baking temperatures, were fabricated through the above-described steps. The three types of liquid crystals in the completed liquid crystal display panels had specific resistances of about $7.0 \times 10^{12}$ Ω·cm, about $1.0 \times 10^{13}$ Ω·cm, and about $3.3 \times 10^{13}$ Ω·cm, respectively, at room temperature which were not so much different from the specific resistances they had before being dispensed onto the TFT substrates 2.

Figure 6:
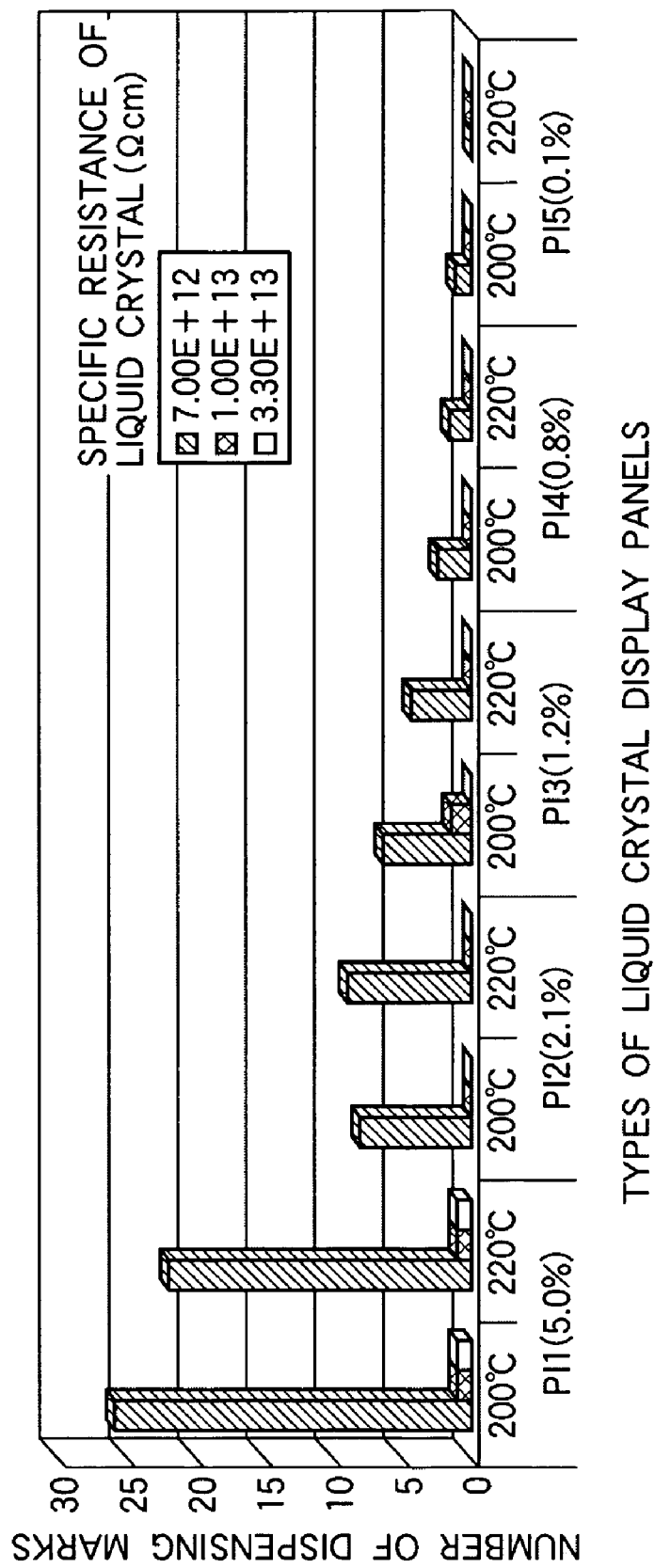
FIG. 6 is a graph showing the number of dispensing marks visually perceived on each liquid crystal display panel.

A voltage of 2.5 V was applied to the liquid crystal layers 6 of the thirty types of liquid crystal display panels to display an intermediate tone, and display conditions were checked with attention primarily paid to the presence of dispensing marks. FIG. 6 is a graph showing the number of dispensing marks visually perceived on each of the liquid crystal display panels having a liquid crystal dispensed in 44 locations thereof. The types of the liquid crystal display panels are listed in the horizontal direction of the graph, and the number of dispensing marks (the number of occurrence of dispensing marks) is plotted along the ordinate axis. The liquid crystal display panels are first categorized by the alignment film materials PI1 to PI5, then categorized by the baking temperatures of the alignment films (200° C. and 220° C.), and finally categorized by the types of liquid crystals. As apparent from FIG. 6, a liquid crystal display panel has a smaller number of visually perceivable dispensing marks, the higher the specific resistance of the liquid crystal used to fabricate the same, regardless of the type of the alignment film material and the alignment film baking temperature. A relatively great number of dispensing marks are visually perceived on all of the liquid crystal display panels fabricated using the liquid crystal having a specific resistance of $7.0 \times 10^{12}$ Ω·cm. On the contrary, substantially no dispensing mark is visually perceived (the number of dispensing marks is substantially 0) on all of the liquid crystal display panels fabricated using the liquid crystal having a specific resistance of $1.0 \times 10^{13}$ Ω·cm and the liquid crystal display panels fabricated using the liquid crystal having a specific resistance of $3.3 \times 10^{13}$ Ω·cm. There was substantially no difference in the number of dispensing marks between the liquid crystal display panels fabricated using the liquid crystal having a specific resistance of $1.0 \times 10^{13}$ Ω·cm and the liquid crystal display panels fabricated using the liquid crystal having a specific resistance of $3.3 \times 10^{13}$ Ω·cm. There is a tendency that the number of visually perceivable dispensing marks is smaller, the lower the water absorbability the alignment film used (or the lower the voltage holding capacity change rate of the alignment film).

As apparent from the above, a liquid crystal display employing the PSA technique can be provided with reduced visual perceptibility of a dispensing mark and hence high display quality even when fabricated according to the ODF method by using a liquid crystal having a specific resistance of $1 \times 10^{13}$ Ω·cm or more at room temperature or a liquid crystal which has a specific resistance of $1 \times 10^{13}$ Ω·cm or more at room temperature after the liquid crystal display is completed.

EXAMPLE 2

Example 2 in the present embodiment of the invention will now be described. In vertical alignment type liquid crystal displays such as MVA type displays in which liquid crystal molecules are aligned perpendicularly to substrate surfaces, switching of light is performed primarily using birefringence of the liquid crystal. In a vertical alignment type liquid crystal display, in general, there is a phase difference attributable to birefringence between light traveling in a direction normal to the display screen and light traveling in a direction oblique to that direction. Thus, gradation-luminance characteristics (γ-characteristics) in the direction oblique to the screen deviate from set values for all gradations, although the degree of deviation varies. Since the characteristics of transmittance relative to the voltage applied to the liquid crystal (T-V characteristics) in the direction normal to the display screen are therefore different from those in the oblique direction, a problem arises in that a color on the screen appears whitish when viewed in the oblique direction because of distortion of the T-V characteristics even if the T-V characteristics are optimized in the direction normal to the screen.

In order to solve the above-described problem, in the liquid crystal display of the present example employs a pixel structure in which one pixel is divided into two sub-pixels A and B; a pixel electrode at the sub-pixel A is electrically connected to a source electrode of a pixel-driving TFT; and a pixel electrode at the sub-pixel B is floated by insulating it from the source electrode of the TFT. By using such a pixel structure, the pre-tilt angle of liquid crystal molecules regulated by polymer layers 52 and 53 is varied between the sub-pixels A and B.

Figure 7:
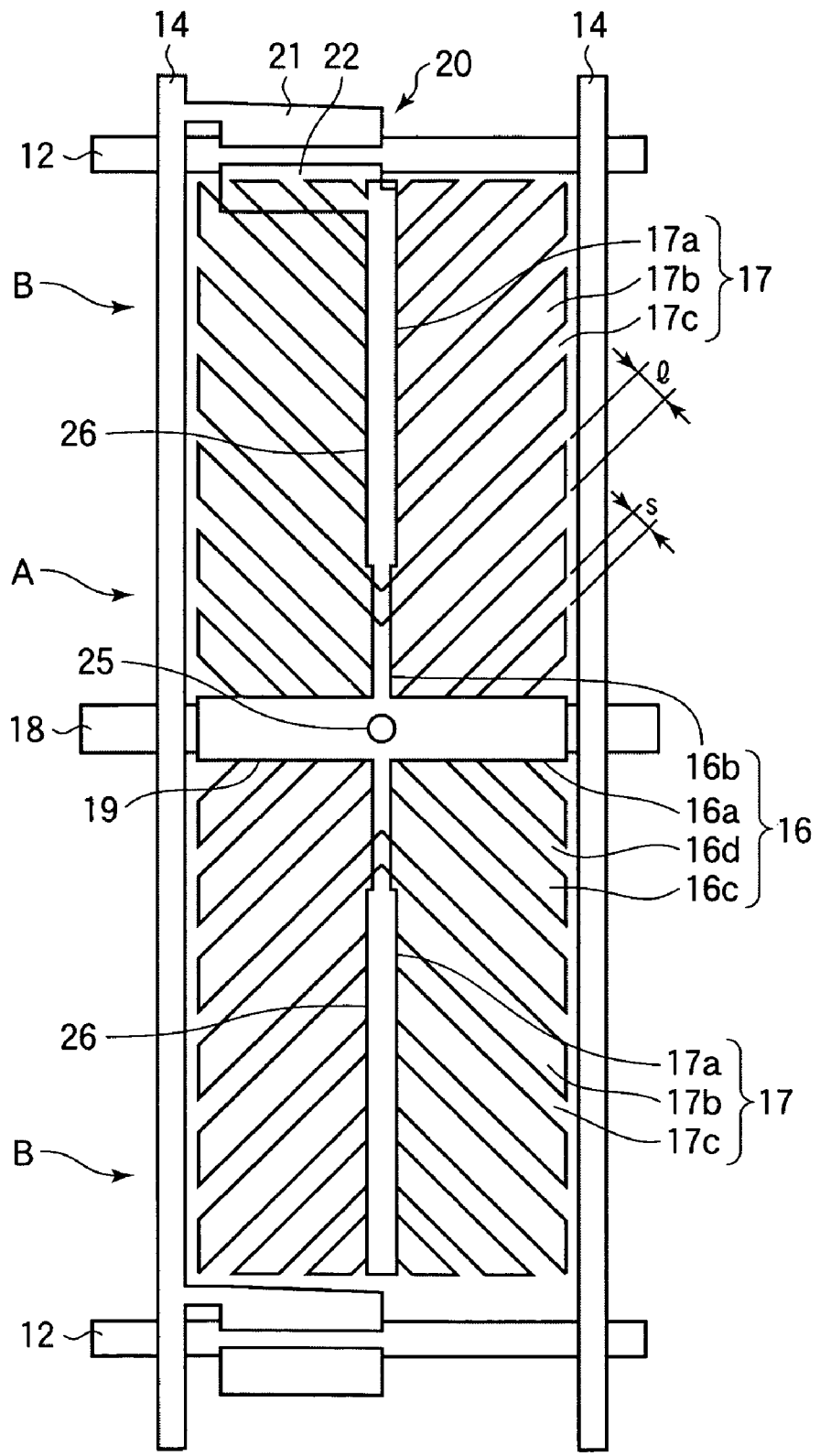
FIG. 7 shows a configuration of one pixel of a liquid crystal display of Example 2 of the embodiment.

FIG. 7 shows a configuration of one pixel of the liquid crystal display of the present example. As shown in FIG. 7, each pixel region of the liquid crystal display of the present example includes a sub-pixel A provided in the middle and two sub-pixels B provided above and under the sub-pixel A in the figure. For example, the ratio of the area of the sub-pixel A to the area of the sub-pixels B (the sum of the areas of the two sub-pixels B) in one pixel is 5:5. A first pixel electrode 16 is formed at the sub-pixel A, and a second pixel electrode 17 separate from the pixel electrode 16 is formed at the sub-pixel B from the same material and in the same layer as the pixel electrode 16, for example. A control capacitance electrode 26 extending in the vertical direction in the figure in electrical connection to the source electrode 22 and a storage capacitor electrode 19 is formed in the pixel region. The control capacitance electrode 26 is disposed to face at least a part of the pixel electrode 17 with an insulation film interposed between them.

The pixel electrode 16 formed at the sub-pixel A includes a linear electrode 16a disposed in an overlapping relationship with a storage capacitor bus line 18 and the storage capacitor electrode 19 and extending substantially in parallel with gate bus lines 12 and a linear electrode 16b extending substantially in parallel with drain bus lines 14. The pixel electrode 16 also includes a plurality of linear electrodes 16c obliquely branching from the linear electrode 16a or 16b and extending in the form of stripes in four orthogonal directions in the sub-pixel A and fine slits 16d formed between linear electrodes 16c which are adjacent to each other. For example, the linear electrodes 16c have a width 1 of 6 µm, and the fine slits 16d have a width s of 3.5 µm. The pixel electrode 16 is electrically connected to the storage capacitor electrode 19 and the source electrode 22 through a contact hole 25.

The pixel electrode 17 formed at each of the two sub-pixels B includes a linear electrode 17a disposed to overlap the control capacitance electrode 26 with a protective film 31 interposed and extending substantially in parallel with the drain bus lines 14, a plurality of linear electrodes 17b obliquely branching and extending from the liner electrode 17a, and fine slits 17c formed between linear electrodes 17b adjacent to each other. The widths of the linear electrodes 17b and the fine slits 17c are substantially the same as the widths of the linear electrodes 16c and the fine slits 16d, respectively.

Figure 8:
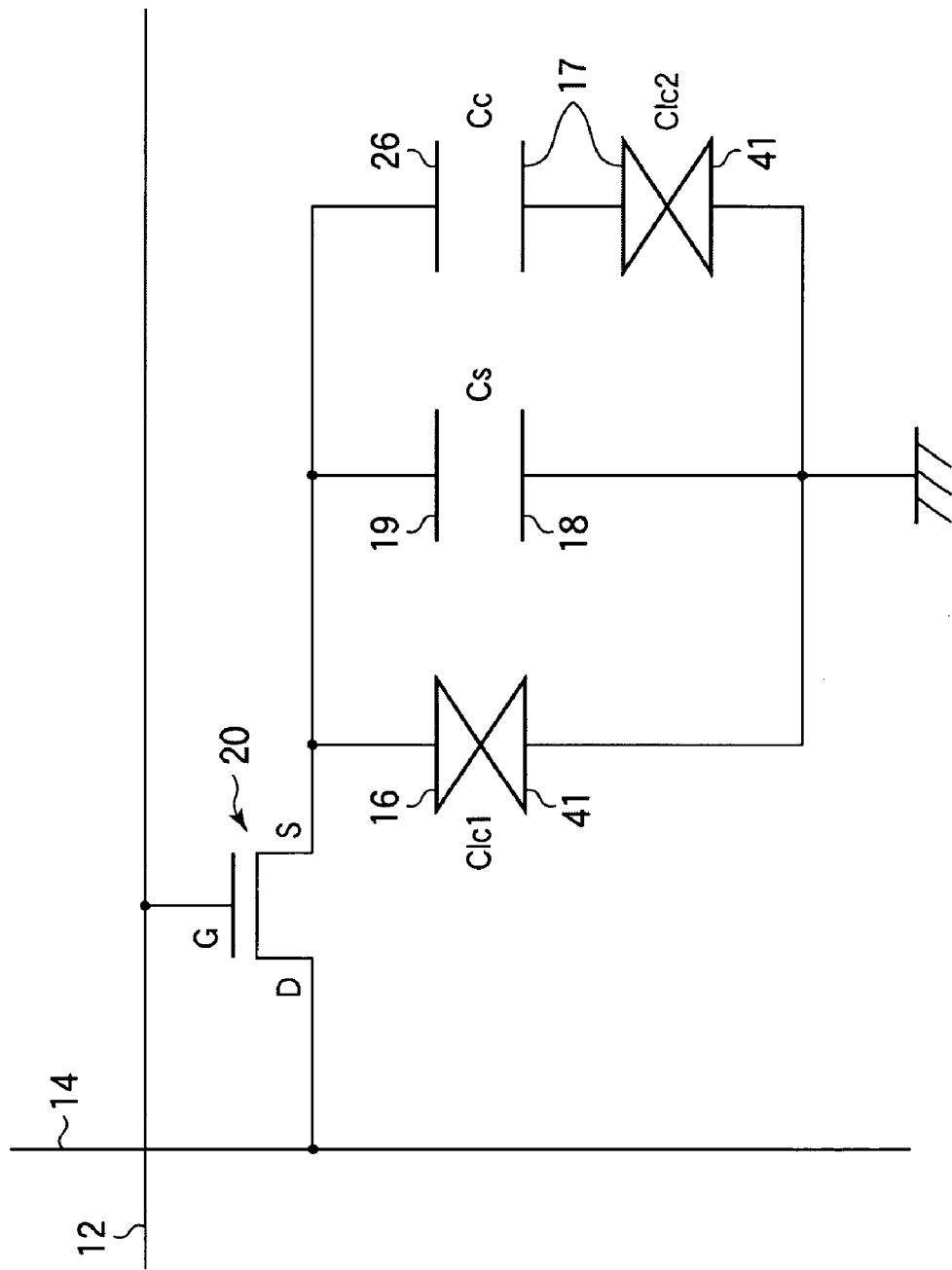
FIG. 8 shows an equivalent circuit of one pixel of the liquid crystal display of Example 2 of the embodiment.
Figure 9:
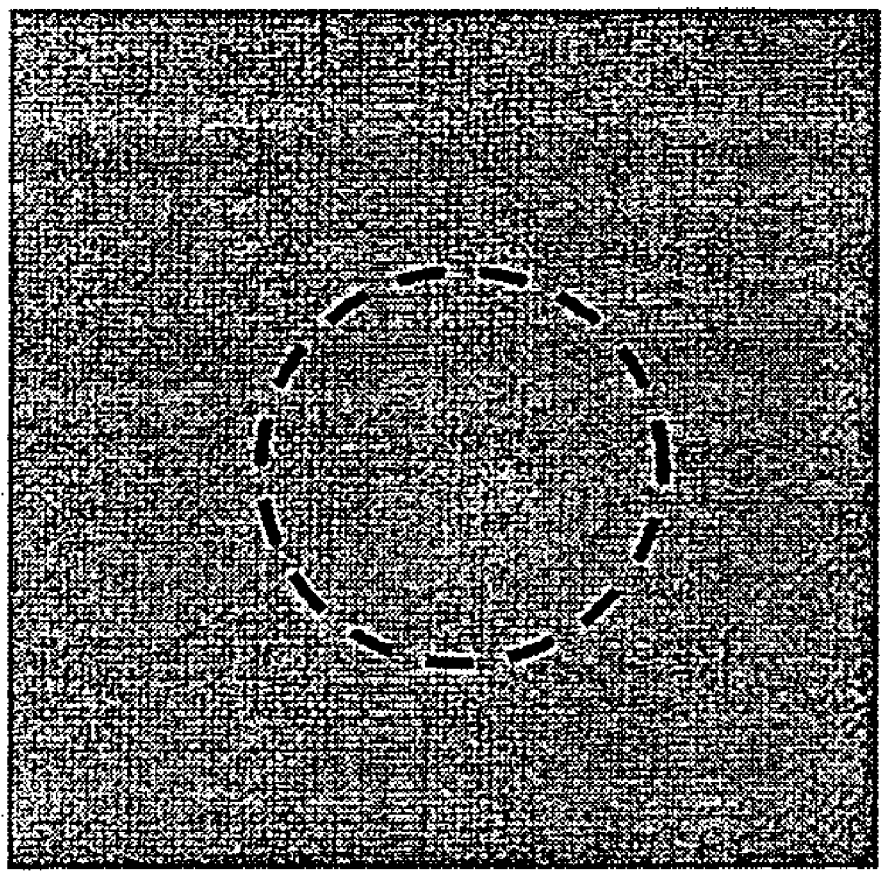
FIG. 9 is an enlarged view of a part of a display screen of a liquid crystal display fabricated using the ODF method.

FIG. 8 shows an equivalent circuit of one pixel of the liquid crystal display of the present example. As shown in FIG. 8, the source electrode 22 (S) of a TFT 20 is electrically connected to a pixel electrode 16, a storage capacitor electrode 19, and a control capacitance electrode 26. A first liquid crystal capacitance Clc1 is formed by the pixel electrode 16, a common electrode 41 on an opposite substrate 4 facing the pixel electrode 16, and a liquid crystal layer 6 sandwiched between the pixel electrode 16 and the common electrode 41. A storage capacitor Cs is formed by the storage capacitor electrode 19, a storage capacitor bus line 18 facing the storage capacitor electrode 19, and an insulation film (insulation film 30) sandwiched between the storage capacitor electrode 19 and the storage capacitor bus line 18. A control capacitance Cc (control capacitance portion) is formed by a control capacitance electrode 26, a pixel electrode 17 facing the control capacitance electrode 26, and an insulation film (insulation film 31) sandwiched between the control capacitance electrode 26 and the pixel electrode 17. A second liquid crystal capacitance Clc2 is formed by a pixel electrode 17, the common electrode 41 on the opposite substrate 4 facing the pixel electrode 17, and the liquid crystal layer 6 sandwiched between the pixel electrode 17 and the common electrode 41. The present example employs a configuration in which the same electrical potential is applied to the storage capacitor bus line 18 and the common electrode 41.

As thus described, a pixel of the liquid crystal display of the present example has a circuit configuration in which the second liquid crystal capacitance Clc2 and the control capacitance Cc are connected in series and in which those capacities are parallel-connected to the first liquid crystal capacitance Clc1 and the storage capacitor Cs, respectively. When the TFT 20 is turned on, a potential applied to the drain bus line 14 is applied to the pixel electrode 16, the storage capacitor electrode 19, and the control capacitance electrode 26, and a common potential is applied to the storage capacitor bus line 18 and the common electrode 41. Thus, the pixel electrode 17 is kept at a potential lower than the potential applied to the pixel electrode 16 by a predetermined amount. A voltage Vpx2 applied to the liquid crystal layer 6 at the sub-pixel B is given as follows where Vpx1 represents a voltage applied to the liquid crystal layer 6 at the sub-pixel A.

$$Vpx2 = (Cc/(Clc2+Cc)) \times Vpx1$$

Since $0 < (Cc/(Clc2+Cc)) < 1$, the magnitude of the voltage Vpx2 is smaller than that of the voltage Vpx1 ($|Vpx2| < |Vpx1|$) except when Vpx1=Vpx2=0.

As thus described, in the liquid crystal display of the present example, the voltage Vpx1 applied to the liquid crystal layer 6 at the sub-pixel A can be made different from the voltage Vpx2 applied to the liquid crystal layer 6 at the sub-pixel B in a single pixel. Polymer layers 52 and 53 are formed by polymerizing a monomer included in the liquid crystal while applying different voltages to the liquid crystal layer 6 at the sub-pixels A and B. Thus, the pre-tilt angle of liquid crystal molecules regulated by the polymer layers 52 and 53 varies between the sub-pixels A and B, and the aligning direction of the liquid crystal can be divided in the single pixel not only in the azimuth direction of the display screen but also in the polar direction thereof. Further, since different voltages are applied to the liquid crystal layer 6 at the sub-pixels A and B when the liquid crystal display is actually driven, any distortion in T-V characteristics in an oblique direction can be distributed in one pixel. It is therefore possible to suppress the phenomenon of a whitish change in the color of an image in a view in an oblique direction and to thereby provide a liquid crystal display having a wide viewing angle in which viewing angle characteristics have been improved.

In the present example, thirty types of liquid crystal display panels were fabricated through steps similar to those in Example 1 by using TFT substrates 2 having the pixel structure as shown in FIG. 7 and combining three types of liquid crystals, five types of alignment film materials, and two alignment film baking temperatures as done in Example 1.

A voltage of 2.5 V was applied to the liquid crystal layers 6 of the thirty types of liquid crystal display panels to display an intermediate tone, and display conditions were checked with attention primarily paid to the presence of dispensing marks. In the present example, substantially no dispensing mark was visually perceived on all of liquid crystal display panels fabricated using a liquid crystal having a specific resistance of $1.0 \times 10^{13}$ Ω·cm or more just as in Example 1.

As described above, a liquid crystal display employing the PSA technique can be provided with reduced visual perceptibility of a dispensing mark and hence high display quality even when fabricated according to the ODF method by using a liquid crystal having a specific resistance of $1 \times 10^{13}$ Ω·cm or more at room temperature.

The invention is not limited to the above-described embodiment of the invention and may be modified in various ways.

For example, although a transmissive liquid crystal display has been referred to by way of example in the above-described embodiment of the invention, the invention is not limited to the same and may be applied to other liquid crystal displays such as reflective and transflective displays.

Further, although a liquid crystal display having CF resin layers 40 formed on an opposite substrate 4 has been referred to by way of example in the above-described embodiment of the invention, the invention is not limited to the same and may be applied to a liquid crystal display having the so-called CF-on-TFT structure in which color filters are formed on a TFT substrate 2.

What is claimed is:

1. A method of manufacturing a liquid crystal display, comprising the steps of:
    dispensing a liquid crystal including a polymeric component and having a specific resistance of $1\times10^{13}$ $\Omega\cdot$cm or more at room temperature (25° C.) onto a first substrate;
    combining the first substrate with a second substrate in vacuum and thereafter restoring the atmospheric pressure to fill a gap between the first and second substrates with the liquid crystal;
    polymerizing the polymeric component while applying a predetermined voltage to the liquid crystal; and
    wherein the display comprises first and second alignment films adjacent the liquid crystal, where at least one of the alignment films has a voltage holding capacity change rate of no more than 5.0% when the alignment film absorbs water.

2. A liquid crystal display comprising:
    a pair of substrates provided opposite to each other;
    a liquid crystal sealed between the pair of substrates and having a specific resistance of $1\times10^{13}$ $\Omega\cdot$cm or more at room temperature (25° C.);
    a seal material continuously formed in a peripheral part between the pair of substrates;
    a polymer layer which is formed in the vicinity of an interface between the liquid crystal and the substrates as a result of polymerization of a polymeric component included in the liquid crystal and which regulates the direction of alignment of the liquid crystal; and
    wherein the display comprises first and second alignment films adjacent the liquid crystal, where at least one of the alignment films has a voltage holding capacity change rate of no more than 5.0% when the alignment film absorbs water.

3. A liquid crystal display according to claim 2, further comprising:
    a plurality of pixel regions each having a first pixel electrode formed on one of the substrates and a second pixel electrode formed on the one of the substrates and separated from the first pixel electrode;
    a transistor which is provided at each of the pixel regions and which has a source electrode electrically connected to the first pixel electrode; and
    a control capacitance portion which has a control capacitance electrode electrically connected to the source electrode and disposed to face at least a part of the second pixel electrode with an insulation film interposed between them and which capacitively couples the source electrode and the second pixel electrode.

4. A liquid crystal display according to claim 2, wherein the liquid crystal has negative dielectric constant anisotropy.

5. The display of claim 2, wherein the display comprises first and second alignment films adjacent the liquid crystal, where at least one of the alignment films has a voltage holding capacity change rate of no more than 2.1%.

* * * * *